United States Patent [19]

Smith et al.

[11] Patent Number: 4,638,335
[45] Date of Patent: Jan. 20, 1987

[54] OPTICAL RECORDING MEMBER

[75] Inventors: Thomas W. Smith, Penfield; Anthony T. Ward, Webster; David J. Luca, Rochester; Gordon E. Johnson, Webster, all of N.Y.

[73] Assignee: Xerox Corporation, Stamford, Conn.

[21] Appl. No.: 795,757

[22] Filed: Nov. 8, 1985

Related U.S. Application Data

[63] Continuation of Ser. No. 566,765, Dec. 29, 1983, abandoned.

[51] Int. Cl.$^4$ .............................. G01D 15/34
[52] U.S. Cl. ...................... 346/135.1; 346/76 L; 369/284; 430/945
[58] Field of Search .................. 346/135.1, 76 L; 430/945; 358/242, 347; 369/275, 284, 111, 94

[56] References Cited

U.S. PATENT DOCUMENTS

| | | | |
|---|---|---|---|
| 3,560,994 | 2/1971 | Wolff | 346/76 L X |
| 3,696,344 | 10/1972 | Feinleib | 346/135.1 X |
| 3,825,233 | 7/1974 | Henderson | 259/182 |
| 3,911,444 | 10/1975 | Lou | 346/76 L X |
| 4,032,691 | 6/1977 | Kido et al. | 428/304 |
| 4,097,895 | 6/1978 | Spong | 358/128 |
| 4,176,277 | 11/1979 | Bricot et al. | 250/316.1 |
| 4,216,501 | 8/1980 | Bell | 358/128.5 |
| 4,230,939 | 10/1980 | deBont | 346/135.1 X |
| 4,237,468 | 12/1980 | Nahara | 346/135.1 |
| 4,268,840 | 5/1981 | Schank | 346/135.1 X |
| 4,269,137 | 5/1981 | Johnson | 118/50.1 |
| 4,283,777 | 8/1981 | Curry et al. | 369/32 |
| 4,285,056 | 8/1981 | Bell | 369/100 |
| 4,290,122 | 9/1981 | Bates et al. | 365/234 |
| 4,310,614 | 1/1982 | Connell et al. | 430/271 |
| 4,329,697 | 5/1982 | Bell | 346/135.1 |
| 4,335,198 | 6/1982 | Hanada | 346/135.1 X |
| 4,340,655 | 7/1982 | Hollister | 346/135.1 X |
| 4,360,895 | 11/1982 | Cornet | 365/127 |
| 4,371,954 | 2/1983 | Cornet | 365/126 |
| 4,379,299 | 4/1983 | Fitzpatrick et al. | 346/1.1 |
| 4,404,656 | 9/1983 | Cornet | 346/135.1 X |
| 4,405,862 | 9/1983 | Bricot et al. | 250/318 |
| 4,410,581 | 10/1983 | Nam | 428/195 |

FOREIGN PATENT DOCUMENTS

| | | |
|---|---|---|
| 0024136 | 2/1981 | European Pat. Off. . |
| 0096504 | 12/1983 | European Pat. Off. . |
| 8402421 | 6/1984 | European Pat. Off. . |
| 0199656 | 9/1984 | European Pat. Off. . |
| 2061594A | 5/1981 | United Kingdom . |

OTHER PUBLICATIONS

Miller et al., A Gallium-Arsenide Laser Facsimile Printer, The Bell System Technical Journal, vol. 58, No. 9, Nov. 1979, pp. 1909-1998.

Voegeli et al., Servo Disc with Overlapping Servo and Data Tracks, IBM Tech. Disc. Bulletin, vol. 16, No. 6, Nov. 1973, p. 1818.

(List continued on next page.)

Primary Examiner—Joseph W. Hartary

[57] ABSTRACT

A multi-layer optical recording member for use with a recording laser for optical recording and retrieving information thereon, as well as a method of fabricating and using said member is described. The optical recording member comprises in sequential order a structural substrate, a thermally degradable polymer layer, a light absorbing recording layer, a thermally degradable polymer dielectric layer, and a reflective layer. The substrate and the thermally degradable polymer layers are stable under ambient light and temperature conditions and substantially transparent to the recording and reading optical radiation. The combined thicknesses of the light absorbing layer and the dielectric layer are such as to provide anti-reflecting conditions at the recording wavelength and optical contrast between marked and unmarked areas at the reading wavelength. The optical recording member may be used with a single laser source for both recording and reading. Upon exposure to recording radiation, the portion of the light absorbing layer exposed is heated by the absorbed energy which in turn heats adjacent areas of both thermally degradable polymer layers to a level where at least some polymer decomposition with a consequent evolution of gaseous decomposition products occurs resulting in the formation of a hole in the exposed area of the heat absorbing layer.

45 Claims, 5 Drawing Figures

OTHER PUBLICATIONS

Burroughs Publication EP79-229 Printing, Coating, Photographic Chemistry, p. 3 Week K21.
Burroughs Publication EP79-230 Printing, Coating, Photographic Chemistry, p. 3 Week K21.
Burroughs Publication EP79-231 Printing, Coating, Photographic Chemistry, p. 4 Week K21.
Burroughs Publication EP79-232 Printing, Coating, Photographic Chemistry, p. 4 Week K21.
Burroughs Publication EP79-233 Printing, Coating, Photographic Chemistry, p. 4 Week K21.
Trilayer Bubble Forming Optical Recording Media–Connell et al., Spie vol. 329–Optical Disk Technology (1982) pp. 166–173.
Barrier Coatings for Optical Recording Media–Smith et al., Spie vol. 329, Optical Disk Technology (1982) pp. 228–235.
Talk–"The Effect of Protective Encapsulation on Imaging Layer Recording Characteristics"–Ward & Smith–Spse 35th Annual Conference–May 1982.
Talk–"Characteristics and Performances of a Novel Optical Recording Material: The Deformation Recording Material (D.R.M.)"–Cornet–Cleo 1981, Washington, D.C.

OPTICAL RECORDING MEMBER

This is a continuation of Ser. No. 566,765, filed Dec. 29, 1983, abandoned.

BACKGROUND OF THE INVENTION

The present invention relates to a novel optical information recording member, methods for preparing such member and to methods of using such a member. In particular, the present invention relates generally to a high density information storage medium suitable for use with optical recording and playback methods and apparatus.

It is known in the prior art to construct optical recording members wherein a laser beam is selectively focused on the surface of the recording member to cause minute melted depressions or deformations in the surface of the recording film. In recording binary data on such an optical recording member, the melted depressions or deformations correspond to bits of information of one's and zero's. Such recorded information can be optically read out at a later time by various known means typically by a second or the same laser beam. Due to the extremely small size of the focused laser beam which is used, a very large amount of information can be recorded on a given area of such an optical recording member. For example, it has been reported that over four million individual bits of binary data have been recorded per square inch of record surface. With such a storage capacity or memory capacity it is clear that devices incorporating this have great utility.

Suitable devices have taken the form of multi-layered optical recording members which are typically made of a reflecting substrate, a layer of dielectric spacing material, and an absorbing imaging layer. Since the imaging layer must be deformed or melted in an extremely short period of time with limited power input, they typically are very thin. Being so thin they are typically sensitive to physical damage by mechanical contact and other devices including the users fingerprints. To protect the imaging layer in such configurations, it has been the practice to either overcoat them or provide a sandwich type configuration. In the air sandwich, the imaging surface is protected from environment attack and physical damage by two relatively thick transparent substrates bonded together within an annular spacer. This structure protects the surface against external surface dust, scratches and fingerprints which are separated from the imaging layer by more than about one millimeter and thus are displaced from the focal plane and so do not contribute to noise and bit errors. In addition, the recording sensitivity of the unprotected surface is preserved. Construction of an air sandwich structure however, requires a great deal of materials engineering relative to substrate and cap materials and adhesive bonding.

In the overcoating approach the imaging layer is protected from direct mechanical contact and thereby mechanical damage is limited by a rather thin transparent layer of an organic polymer or by an even thinner layer of a refractory inorganic such as silica. While this technique can be successful in protecting the device, it suffers the difficulty that recording sensitivity is often degraded. In addition, contaminants on the surface of the protective layer are not separated from the imaging plane by a distance great enough to not contribute to noise and bit errors.

PRIOR ART

There are numerous such recording devices for optical digital recording made from a wide variety of materials available in the prior art. In Bell, U.S. Pat. No. 4,216,501, for example, an optical anti-reflection information record comprising a tri-layer design with a light reflecting substrate such as aluminum, a first coating such as silica which is transparent to recording light and a thin layer of a material absorptive to light of the marking frequency is provided. The thickness parameters are chosen to establish anti-reflecting conditions for the record medium at the recording light frequency. For playback, the reading light is of a frequency at which the disturbed regions are highly reflective and the undisturbed regions of the recording mediums exhibit anti-reflecting conditions.

In Bell, U.S. Pat. No. 4,285,056 an optical recording medium which comprises a light reflecting layer, a light transmissive layer, and a light absorptive layer which may be a thin layer of titanium, platinum, rhodium, gold, nickel, chromium, manganese or vanadium is provided. The light transmissive layer melts, sublimates or decomposes before the light absorptive layer melts to either form a bubble or draw up around the edge of the hole created in the light transmissive layer. Typical light transmissive layers include magnesium or lead fluoride.

In Fitzpatrick, U.S. Pat. No. 4,379,299, an information recording medium with a semiconductive film on a plastic substrate is described. The writing laser produces an area of heat in the film which heats the plastic substrate which decomposes or degases yielding gaseous components with a high pressure that bursts the overlying semiconductor layer.

A similar such device is also provided in Bricot et al. U.S. Pat. No. 4,176,277 which is directed to a high density data carrier capable of being recorded by means of a radiation beam for conversion of the beam energy into thermal energy. The data carrier comprises a substrate on which there is a thin metal film such as bismuth, cadmium or silver and an organic film thermally degradable at low temperature, such as nitrocellulose or polymethyl methylacrylate. The metal film absorbs recording radiation converting it into heat and selectively diffusing the heat to the thermally degradable film raising its temperature to the degradation temperature where upon a microscopic explosion of the thermal degradable film, which mechanically and/or chemically attacks, deforms or bursts the overlying metal layer. The thickness of the thermally degradable film can be adjusted so that it acts as an anti-reflex film vis-a-vis the readout beam when the data carrier is read.

Jean Cornet in a talk entitled "Characteristics and Performance of a Novel Optical Recording Material: The Deformation Recording Material (D.R.M.)" at the CLEO Conference in 1981 at Washington, D.C., described a metal polymer bi-layer, tri-layer device structure wherein the metal could be gold or platinum alloys on a polymethyl methacrylate or polysulfone polymer substrate. Connell et al. in reporting on the Cornet disclosure at the CLEO 1981 Washington, D.C., Conference (unpublished), described a device wherein a thin metal layer such as gold or platinum was deposited on a thermally degradable film such as polymethyl methacrylate or polysulfone in a tri-layer interference device. Smith et al. in an article entitled "Barrier Coatings for Optical Recording Medium" starting at page 228 SCIE volume 326, Optical Disc Technology 1982 described techniques for protecting the thin metal layers from oxidation, and in particular, described tellurium tri-layered structures, and in FIG. 2V shows an inverted anti-reflective tellurium tri-layer on page 233. At the SPSE 35th Annual Conference in May of 1982 in a talk entitled "The Effect of Protective Encapsulation on Imaging Layer Recording Characteristics" Ward and Smith described tri-layer and inverted tri-layer structures where the metal recording layer was sandwiched in between a deformable polymer layer and a degradable polymer.

Each of the devices described suffers deficiencies to one degree or another.

For example, most of the devices described have a free or exposed first surface which is susceptible to damage by contact, distortion by fingerprinting or other debris. While this can be minimized to some degree, it is done so through the complicated process of air sandwiching using annular spacers. With regard to those air sandwich tri-layer devices which use the deformation imaging technique, these devices all require the use of second order anti-reflective design characteristics to ensure optimum contrast on readout. This requires one laser for reading and a different laser for writing. In such a recording apparatus clearly the complexity of the apparatus, cost and manner of operation are compounded. In the tellurium tri-layer devices described, difficulties are encountered in that the tellurium is not terribly resistant to atmospheric oxidation and therefore has limited archival stability unless carefully protected by barrier layers. Those devices which employ a light absorbing layer sandwiched between a layer of thermally deformable polymer and a layer of thermally degradable polymer also typically exhibit deformation (blister) mode recording and require second order anti-reflective design characteristics for optimum contrast on readout. They have relatively low sensitivity to marking because, even with a deformable polymer, deformation mode marking is impared. In this regard, the anti-reflective condition in the device is provided when all the incoming marking radiation is coupled into the recording layer with a minimum of the radiation being reflected. For example, first order anti-reflecting conditions are provided when the wavelength of marking radiation is such that the marking wave will destructively interfer with the reflected wave. The thinnest possible dielectric spacing for this is one quarter the wavelength of the marking radiation. Marking at higher orders results in marking at multiples of the quarter wavelength thickness for the dielectric spacing. Thus with materials that must work with second order anti-reflecting conditions the thickness of the dielectric spacer is greater than the preferred quarter wavelength of the marking laser.

SUMMARY OF THE INVENTION

The present invention is directed to a unique multi-layer optical recording member for use with a single recording/reading laser as well as a method of fabricating such a multi-layer device together with a method of optically recording and retrieving information thereon. In particular, the multi-layer optical recording member according to the present invention for optically recording and retrieving information thereon, includes in sequential order a structural substrate, a thermally degradable polymer layer, a thin light absorbing recording layer, a thermally degradable polymer dielectric layer and a reflective layer, the substrate and the thermally degradable polymer layers being stable under ambient light and temperature conditions and substantially transparent to the recording and reading optical radiation while the combined thickness of the light absorbing layer and the dielectric layer are such as to provide anti-reflecting conditions at the recording wavelength and optical contrast between marked and unmarked areas at the reading wavelength.

In a specific aspect of the present invention, the optical recording member upon being exposed to recording radiation of a recording wavelength is transformed into a recording medium by the portion of the heat absorbing layer which is exposed to the recording radiation being heated by the absorbed energy, which in turn heats adjacent areas of both thermally degradable polymer layers between which the light absorbing layer is sandwiched, the polymer layers being heated to a level where at least some polymer decomposition with a consequent evolution of gaseous decomposition products occurs resulting in the formation of a hole as opposed to deformation in the exposed area of the heat absorbing layer.

In a further aspect of the present invention, the optical recording member is capable of being recorded with radiation of a first wavelength at a first energy level to produce a pattern of minute open holes in the heat absorbing recording layer, which minute pattern is subsequently capable of being read with radiation of the same wavelength but at a lower energy level below that necessary to form a hole in the recording layer.

In a further aspect of the present invention, the light absorbing layer is preferably from about 50 to 100 angstroms in thickness and comprises a metal or metal alloy, while the thermally degradable polymer layers comprise polymers such as nitro cellulose and polymethyl methacrylate.

In a further aspect of the present invention, the reflective layer in the multi-layer structure is aluminum which has an additional protective overcoating on it.

In an additional aspect of the present invention, a preformatted information layer is provided between the structural substrate and the first thermally degradable polymer layer.

In another aspect of the present invention, the multi-layer optical recording member may be fabricated by providing a structural substrate which is substantially transparent to the recording and reading optical radiation onto which is spin coated a first substantially transparent thermally degradable polymer layer followed by the vacuum evaporation of a light absorbing metal layer on said first polymer layer, spin coating a second substantially transparent thermally degradable polymer layer on said metal and vacuum evaporating a light reflecting layer on said polymer layer.

In an additional aspect of the present invention, the optical recording member is read with optical radiation from a laser at the same wavelength but at a lower energy level than that with which it is marked.

For a better understanding of the invention as well as other aspects and further features thereof reference is had to the following drawings and description. The layers depicted in FIGS. 1, 1a, 2 and 3 are illustrative only and are not drawn to scale.

DETAILED DESCRIPTION OF THE INVENTION

The optical recording member according to the present invention is an integral unitary multi-layer optical recording member. Structurally it is a solid member which is dimensionally stable and can be fabricated by relatively simple techniques. In addition, it utilizes two layers, one on each side of the light absorbing layer to initiate the marking process whereas typically such structures in the prior art devices have impeded the marking process by making it occur at a higher energy, wherein the recording laser must be pulsed at higher power frequently resulting in degraded image characteristics. Thus, as indicated, the present device may be used with one laser for both recording and reading. In addition with the hole opening technique according to the present invention, the image contrast is high.

Figure 1:
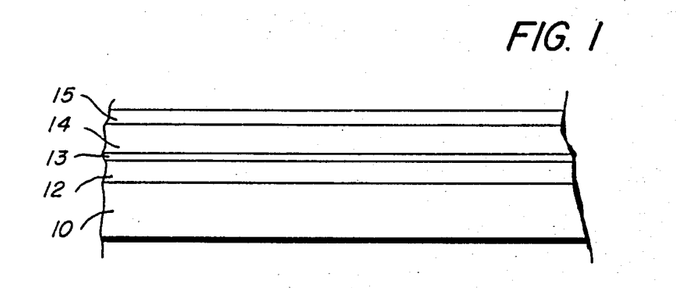
FIG. 1 is a cross sectional view of an embodiment of the multi-layer optical recording member of the present invention.

Referring now to FIG. 1, an optical recording member according to the present invention is illustrated wherein structural substrate 10 provides a structural base as well as the fabricating base for the multi-layer recording member. Coated on substrate 10 is a layer of thermally degradable polymer material 12 on top of which is coated a thin layer of light absorbing material 13 upon which is coated a layer of thermal degradable optical dielectric material 14 upon which is provided a reflecting layer 15.

Figure 2:
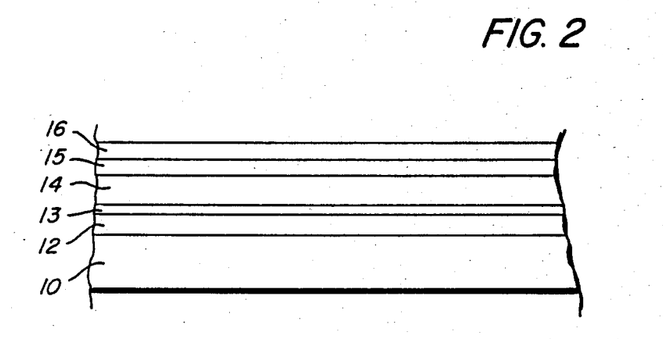
FIG. 2 is a cross sectional view of another embodiment of the optical recording member of the present invention.
Figure 3:
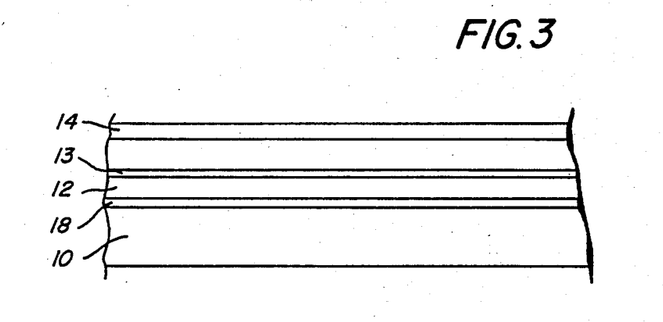
FIG. 3 is a cross sectional view of a further embodiment of the optical recording member according to the present invention.

FIGS. 2 and 3 illustrate the similar device with two additional layers. In FIG. 2, a protective overcoating 16 is provided on top of the reflecting layer 15.

In FIG. 3 a preformat information layer 18 is placed between the structural substrate 10 and the first thermally degradable polymer layer 12.

Figure 1A:
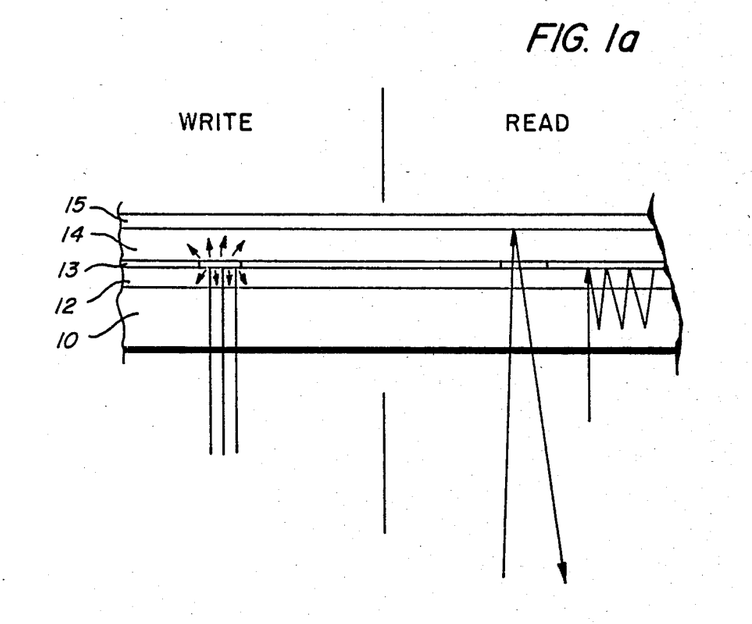
FIG. 1a is a cross sectional view of the device illustrated in FIG. 1 being written and read with optical radiation of the same wavelength.

FIG. 1a illustrates the manner in which the multi-layer optical recording member according to the present invention may be both written (information recorded) and read (information retrieved). In the write mode optical marking radiation from a laser source passes through the structural substrate and the first thermally degradable polymer layer which are both stable under ambient light and temperature conditions, and substantially transparent to the recording wavelength. The light is coupled into the light absorbent layer and is converted to heat. The heat from the light absorbent layer radiates or diffuses into the thermally degradable polymer layers on both sides of the interface. The thermally degradable polymer layers are selected such that their thermal diffusivity is lower than the light absorbing marking layer so that they are heated to a temperature at which the thermally degradable polymer decomposes at least in part to gaseous products. While the thermally degradable polymer materials are being heated and are decomposing during the marking process, the same light absorbing layer is being softened by being warmed. The exact mechanism in which the marking takes place is not fully understood, however, it is believed that an ablative or explosive action of the gases at the two interfaces on both sides of the light absorbing area acts to remove the softened, thin, light absorbing area. In other words, the thermally degradable polymer degrades producing gaseous decomposition products at both sides with sufficient energies to remove the softened thin metal layers from the exposed area. Typically, the energy required in producing the hole opening is of the order of that which would be required to induce deformation in a deformation type device in the absence of a second thermally degradable polymer layer. This evolution of gas which locally bursts the overlying light absorbing layer forms a visible mark in the recording layer by exposing the reflector.

The other portion of FIG. 1a illustrates how the information previously recorded may be read back. In this illustration light coming in through the hole, is reflected back giving high contrast between the hole and the background areas. Since the reading is done at a lower energy with the same laser all the radiation is absorbed by the multi-layer device without marking. The present device has increased marking threshold sensitivity in that it has a distinct marking threshold at a specific energy input as opposed to being spread over a fairly broad range. The present device has a threshold energy level below which no mark will be formed and above which a distinct mark will be very quickly produced. In addition, the device provides enhanced marking latitude with a range of laser powers over which acceptable marking can take place. In this regard it should be noted that for marking processes in the useful time regime of 1–300 nanoseconds hole opening is dependent on the amount of energy put into the device, not the rate at which the energy necessarily goes in. While the exact mechanism in which hole opening occurs is not fully understood, it is believed to be basically some type of ablation technique. In any event, the hole opening is clearly enhanced by the presence of the two thermally degradable polymers since the threshold energy for marking is reduced from that typical of simple hole opening mode recording devices where the metal is coated on a thermally stable surface. Inverted trilayer structures of the type described by Smith and Ward (SPSE 35th Annual Conference), where a deformable metal recording layer is sandwiched between a deformable polymer layer and a thermally degradable polymer, exhibit blister marking at higher threshold energy because the non-thermally degradable polymer, though deformable, still causes impairment of the blister marking process. In this context by degradable polymer we mean a material which decomposes substantially to gaseous products at temperatures below the melting point of the absorbing metal layer. Typically the materials degrade below about 400° C. By deformable polymer we means a plastic material with a low elastic modulus.

Any suitable material may be used as a structural substrate to provide a substrate for the remaining layers in the multi-layer recording device. The substrate should be of optical quality and transparent to the recording and reading wavelength. Typically the substrate is greater than one millimeter in thickness to provide this structural function and to be compatible with the optical system in the recording device. Typical materials include glass or amorphous plastics such as polyvinyl chloride, polymethyl methacrylate, polystyrene, bisphenol-A-polycarbonates, polysulfones, bisdiallyl polycarbonates, cellulose acetate and cellulose acetate butyrate.

The first thermally degradable polymer layer should of course also be optically transparent to the recording and reading wavelength and it should be stable under ambient temperature and light conditions as should the structural substrate. By ambient temperature it is intended to include temperatures of from the extremes of about $-40°$ F. to about $120°$ F. Ambient light conditions are those typically found in the office and the home. In addition, the recording medium should be stable to the repeated exposure to the recording laser.

Typically the first thermally degradable polymer layer is in the range of thickness greater than 500 angstroms up to about several mils. Suitable thermally degradable polymers which have acceptable optical properties and decompose to a gas include, nitrocellulose and vinyl polymers with quaternary carbon centers such as polymethyl methacrylate, polyalphamethyl styrene, polyalkylsulfones and polyvinyl chloride.

The light absorbing layer is one of the most important layers in the multi-layer recording member. Its function is to absorb energy from the impinging laser radiation and to form a hole in response to the ablative action of the decomposing polymer layers adjacent to the light absorbing layer. The resultant hole results in the recorded recording member being able to be read. The light absorbing layer transmits heat to adjacent polymer layers which have low thermal diffusivities. The heat must flow from the light absorbing layer into the adjacent regions thus the thermal conductivity of the light absorbing layer must be such that lateral heat transfer in the plane of the light absorbing layer is low compared to heat transfer to the adjacent polymer layers where heat accumulates. If the thermal diffusivity of the light absorbing layer is too high, the heat will diffuse radially thereby increasing substantially the energy required to form the mark. In addition, devices comprised of absorbing layers with high thermal diffusivity will often exhibit reciprocity failure, i.e., more energy would be required to mark with a larger laser pulse than a short laser pulse. When associated with the thermally degradable dielectric polymer layer, the total thickness should be such as to lead to an anti-reflecting condition for the write/read laser wavelength. Typically the light absorbing layer is from 25 to 200 angstroms with a narrower range of 50 to 100 angstroms being preferred to provide a better anti-reflective minimum to minimize lateral heat loss and the ablative action required to open the hole. In addition, thinner layers also provide a better antireflective minimum, the thinner the layer the lower the reflectivity of the device. Typical materials include gold, titanium, chromium, manganese, copper, silver, tin and cadmium. Gold, gold alloyed with other metals such as chromium, maganese, magnesium, palladium, platinum, and aluminum, for example, are preferred in providing proper balance between thermal conductivity of the light absorbing layer as well as the malleable, physical softening or melting properties. Gold itself is, of course, highly deformable and malleable as well as having a very high thermal conductivity. By alloying the gold, it is possible to maintain the malleable properties while obtaining a wide range of lower thermal conductivities more suitable to the marking process. Gold forms alloys with maganese and chromium, for example, across a broad composition spectrum and provides alloys which soften and have melting points higher than the decomposition temperatures of the polymers used in the thermally degradable layers. A particularly preferred material is gold alloyed with chromium in an amount sufficient to reduce the thermal conductivity of the layer while retaining its malleable and deformable properties. Typically the chromium in the gold chromium alloy is present in an amount up to 90 atomic percent. Preferably the chromium is present in an amount of at least 20 atomic percent with optimum balance in properties being obtained when the chromium is present in an amount greater than 40 atomic percent.

As with the first thermally degradable polymer layer the second thermally degradable polymer (dielectric) layer should decompose at least in part to gaseous decomposition products when heated by the light absorbing layer. Typically it has the same properties as the first thermally degradable polymer layer and is of the thickness of the order of 500 to 4000 angstroms depending on the wavelength of the marking, reading radiation and may be selected from the same materials used in the first thermally degradable polymer layer.

The final layer illustrated in FIG. 1 is the reflector layer which may comprise any suitable high reflective opaque material which does not transmit light. It is an infinitely, optically thick device typically having a thickness greater than about 1000 angstroms. Suitable materials include aluminum, chromium, titanium, silver and gold.

The thermally degradable dielectric layer, as previously indicated, should be of a thickness chosen that when associated with the light absorbing layer gives anti-reflection properties to the layer.

By the term "anti-reflecting conditions", it is meant that the incident radiation on the optical recording member is substantially entirely absorbed by the recording member, and very little of the incident radiation is reflected. Since the reflector layer is highly reflecting, and thus does not absorb much of the incident radiation, and since the dielectric layer and any overcoating layer are essentially transparent and they also do not absorb much of the incident radiation, most of the energy in the laser beam is absorbed by the recording layer when anti-reflecting conditions are achieved. This represents the maximum use of the energy in the laser beam for marking purposes. As indicated above, the anti-reflecting conditions are achieved by taking into consideration the thickness of the recording and the dielectric layers, their indices of refraction, and the reflectivity of the reflector layer, to result in the cancellation of electric vector phase and amplitude at any given incident wavelength. Once the material for the dielectric layer has been determined, the thickness of the dielectric layer and the absorbing layer can be calculated from the classical simulation routines of ellipsometry. Such calculations are well known in the art and are shown for example in F. L. McCrackin, NBS Technical Note No. 479 (1969), and in Spong U.S. Pat. No. 4,097,895. These routines permit the calculation of the effective refractive index, absorption constant and reflectivity of a thin film multi-layer device as a function of component layer thickness and refractive index, incident light wavelength, angle of incidence and ambient refractive index.

Although it is important for the optical recording member to achieve anti-reflecting conditions at the marking wavelength, it is also desirable to have its reflectivity at the read-out wavelength somewhat greater than five to ten percent to facilitate dynamic optical focus control. However, if a capacitive focus technique, such as that disclosed in Landwer U.S. Pat. No. 3,825,323, is used, then the reflectivity of the unmarked device at the read-out wavelength needs not be kept above a minimum level for focusing purposes.

While the above constitutes the essential elements in the optical recording member of the present invention, it is desirable that this member have one or two additional functional layers. In particular, it is desirable to protect the metallic reflector by providing a protective barrier against damage. In addition, this protective barrier may suppress the deformation of the reflector layer that otherwise may occur when the gas is formed during decomposition of the dielectric spacer which explodes and which otherwise might deform the reflector layer even though such deformation is not detrimental to the image on the marking process. With a protective overcoating, the reflector layer is not suceptible to being deformed and thereby forces decomposition gases back into the interface between the degradable dielectric and the light absorbing layer resulting in a sharper marking threshold. Any suitable material may be used as this protective barrier. A typical material is a solution coated polymer such as polystyrene.

In addition it may be desirable to include a preformatted information layer between the structural substrate and the first thermally degradable polymer layer. Such a layer could have a pre-groove pattern of machine readable information giving the previous history of information on the disk as to sector location of items on the disk. Such a pre-groove pattern of information may be embossed on the structural substrate prior to coating with the first thermally degradable polymer layer by any of a number of well known replication techniques. For example, replication with photopolymers or injection molding are satisfactory techniques for putting this preformat information on the recording medium. The grooves in the preformatted layer provide tracks and record address whereas the actual recording can take place in the groove or in the area between preformatted grooves. Thus while the preformat information is physically in the device and forms a machine readable deformation type pattern from an optical standpoint by virtue of optical interference between read out laser light reflected from the grooves and read out laser light reflected from the "land" areas between the grooves the device is essentially flat for all practical subsequent data recording and reading purposes. With this feature, any sector may be readily addressed which because of the large volume of information that may be stored in the recording member is important for ready retrieval.

Of course, if desired, a subbing layer which once applied effectively becomes part of the substrate may also be used to render the structural substrate optically smooth, or otherwise appropriate for the deposition of the other layers in the recording member. Such a material should of course have good optical properties, be transparent, and may be deposited in thicknesses of from 1000 angstroms to several mils in thickness. Typical materials that may be used as a separate subbing layer include, polystyrene, vinyl polymers such as polyvinylchloride, epoxy or epoxy acrylates, urethanes and other amorphous polymers known in the art. In addition, an active subbing layer serving two purposes, that of the subbing layer and of the dielectric spacing layer may be used. In this instance the subbing layer may be made from polymethylmethacrylate, polyalphamethyl styrene or nitrocellulose.

The multi-layer optical recording member of the present invention may be made in any suitable way. Typically the transparent structural substrate may have a pre-grooved pattern of information embossed by injection molding or replication with photopolymers as previously indicated. Thereafter, the first thermally degradable polymer layer may be spin coated onto the substrate which essentially replicates the pattern of the pre-grooved information on the substrate. Thereafter the polymer layer may be subjected to glow discharge treatment as described in U.S. Pat. Nos. 4,269,137 (Johnson) and 4,310,614 (Connell et al.). In this treatment an ionized gas bombards the polymer the layer thereby modifying (etching) the polymer surface by changing the surface to increase the nucleation sites in the polymer surface and the subsequent nucleation density in the metal deposition step and thereby enable the deposition of continuous thin film. For example, if the polymer surface is exposed to a plasma of gaseous ions containing oxygen, the surface may have incorporated therein excited oxygen species in the film. Similarly, if the atmosphere includes nitrogen, nitrogeneous ions may be present in the film. In addition, it is possible to obtain some physical etching of the polymer film wherein some sputtering of fragments away from the polymer film may occur. This also increases the nucleation density and provides better adhesion between the surface and the thin film next deposited on the polymer layer. Subsequently the light absorbing metal layer may be put down by vacuum evaporation which also replicates the pre-grooved pattern. The dielectric spacing layer of thermally degradable polymer may then also be spin coated onto the light absorbing layer and this also replicates the pattern. Alternatively, the thermally degradable polymer layers may be deposited from the gas phase by plasma polymerization. On top of the dielectric layer vacuum evaporation of the light reflecting layer such as aluminum which is optically infinitely thick may be performed followed by application of the protective overcoating. Since the information recorded on these optical recording members is composed of submicron holes these members must be fabricated in all instances under clean room environments.

The following illustrates the typical fabrication procedure for the multi-layer optical recording members according to the present invention.

1. Substrate Cleaning

A polymethyl methacrylate substrate is cleaned with the listed agents in the following steps.

a. Methanol—spray rinse
b. Distilled water—spray rinse
c. Detergent solution—light scrub
c. Distilled water—spray rinse
e. Methanol—spray rinse
f. Distilled water—spray rinse
g. Distilled water—dip rinse (slow withdrawal)
h. Distilled water—dip rinse (slow withdrawal)
i. Bake—2 or more hours @50° in air The slow removal of the substrate in steps g and h reduces the amount of water "cling" to the disk surface.

2. Thermally Degradable/Subbing Layer.

A 1500 angstrom sublayer of PMMA is laid down by applying the polymer in solution through a filtered syringe on a disk spinning at about 125 RPM. Starting near the center of the disk, the polymer is deposited in a small stream which is slowly moved outward towards the edge of the disk along the outer edge of the expanding polymer annulus. When the outer rim of the disk has been reached, application of polymer is stopped and the disk is allowed to spin for an additional 10 seconds giving time for the polymer to spread smoothly over the disk. The speed is then increased to a rate which will give the desired film thickness. The final spin step is normally held for about 100 seconds. After spinning is complete, the disk is moved quickly to a nearby oven where it is baked for an hour or more at 50° C. The baking step reduces the solvents and moisture absorbed by the disk and significantly reduces the pumpdown time required in a vacuum deposition system.

3. Glow discharge treatment

When the PMMA sublayer has been sufficiently baked, the disk is removed from the oven, blown off with ionized $N_2$ and inserted into the $AuCr_3$ deposition system. The system is then pumped down to a pressure of $5 \times 10^{-6}$ torr or less. At this time the glow discharge sequence is started. The parameters generally used for the glow discharge are as follows:

| | | |
|---|---|---|
| a. Purge system pressure | $3.5 \times 10^{-5}$ | torr |
| b. Purge Time | 2 | minutes |
| c. Emitter current | 8 | amps. |
| d. Anode voltage | +1300 | volts |
| e. Anode current | 15 | ma |
| f. Chamber pressure | 2.5 | u |
| g. Treatment time | 5 | minutes |
| h. Cool down time prior to start of $AuCr_3$ deposition | 5 | minutes |

4. $AuCr_3$ Deposition

After completion of the glow discharge sequence, the $AuCr_3$ deposition is initiated immediately with no break in vacuum between the two steps.

In all depositions performed here, $AuCr_3$ is thermally evaporated from a RD Mathis S2B-015W source. Since both Au and Cr boil at different temperatures, precisely measured amounts of each material are placed in the source so that when both materials have boiled off to completion, a stoichiometrically correct $AuCr_3$ film of a desired thickness will be achieved. This film may not be completely homogeneous, but the optical results are reproducible from disk to disk. With the geometry of our system, a 70 angstrom film of $AuCr_3$ requires 0.04731 gm Au and 0.03744 gm Cr, etc. Other deposition parameters for an $AuCr_3$ film are:

| | |
|---|---|
| a. Material variable | 118 quartz crystal monitor setting to provide a 70 angstrom film of Au $Cr_3$ |
| b. Source preheat | 1 minute @ 100 amps |
| c. Deposition current | 150 amp |
| d. Deposition rate | 0.5 angstroms/sec (average over total disk surface or 2.0 angstroms/sec arrival rate at the disk surface) |

The disk is allowed to cool down for at least 30 minutes after the deposition before its removal.

5. Dielectric Spin Coating

The dielectric layer about 1000 angstroms thick is applied in the same way as the first thermally degradable subbing layer. After coating is completed, the disk is placed in an oven and baked for an hour or more at 50° C. which reduces the pump down time required by the aluminum vacuum deposition system.

6. Aluminum Deposition

At the completion of the dielectric bake, the disk is removed from the oven, blown off with clean ionized $N_2$, placed in an electric beam deposition system and the chamber pumped down to $5 \times 10^{-6}$ tor or better.

An aluminum film of 500 to 1000 angstroms is deposited on the dielectric by an Airco Temescal STIH-270-1 electron beam gun powered by a CV-8A voltage supply. The deposition parameters used are:

a Source warm up—2 minutes @20-120 ma
b. Deposition current—about 150 ma
c. Deposition rate—5 angstroms/sec (average for total disk surface or 20 angstroms/sec spot rate)

The system is allowed to cool down for 30 minutes or more before the finished disk is removed.

7. Protective Sandwiching

A thick PMMA layer can be placed on the aluminum surface by spin coating to complete the structure and to provide adequate protection to the aluminum layer.

Typical other structures that are suitable multi-layer optical recording members according to the present invention including the following:

While the multi-layer optical recording member according to the present invention may be used with laser recording devices of one wavelength and laser reading devices of a second wavelength, a principle advantage is its capability of being used with the same laser in both the recording and reading or retrieving modes of operation. This enables a total recording and playback scheme of increased simplicity, dramatically reduced costs, and required apparatus. Typically the multi-layer optical recording members can be used with those commercially available lasers listed below which generate radiation at the stated wavelengths.

| | |
|---|---|
| Diode Laser | 7800–8300 angstroms depending upon manufacturer |
| Helium/Neon Laser | 6300 angstroms |
| Helium/Cadmium | 4415 angstroms or 5145 angstroms |

In each instance it is noted that the thickness of the combined light absorbing layer and dielectric layer is selected to achieve anti-reflecting conditions. For example, first order anti-reflecting conditions useful with all the above indicated radiation wavelengths may be obtained with a device containing an 800 to 1000 angstrom thickness dielectric spacer layer and a 50 to 100 angstrom thickness metal layer. Such a device has minimal reflectivity across the visible, ultraviolet and infrared spectrum. Furthermore, higher order anti-reflective tri-layer devices using a gold chormium marking layer about 140 angstroms thick with a dielectric spacing layer 2000 angstroms thick can be used with a helium cadmium laser for both writing and reading since such a layer provides a minimal reflectivity at about 4000 angstroms. In addition, a second order device may be fabricated with a dielectric spacer about 2000 angstroms thick and a gold chromium alloy marking layer about 70 angstroms thick, which can be used for either the diode or the helium cadmium laser for both writing and reading since a reflection mimimum is obtained near 8000 angstroms.

Figure 4:
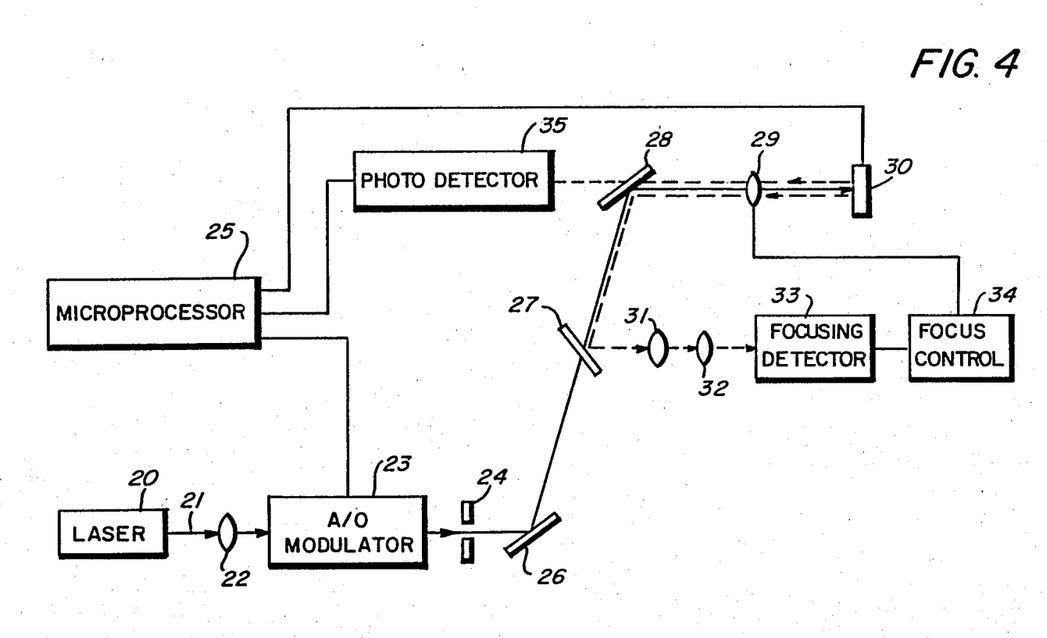
FIG. 4 is a block diagram of a system for recording and retrieving information from the optical recording member of the present invention.

FIG. 4 shows schematically an apparatus which may be used to record information on the optical recording member of the present invention as well as to read the information recorded on such a member.

A beam 21 is generated by a laser device 20 and goes through a focusing lens 22 into an acousto-optic modulator 23, and from there through a hole or slit 24. The A/O modulator 23 is controlled by a microprocessor 25, and it controls both the duration and the amplitude of pulse of the beam that will be permitted to go through hole 24. A single solid state laser with internal modulation can be substituted for the laser device 20, lens 22 and A/O modulator 23. From the hole 24 the beam is directed by a reflecting mirror 26 to a beam splitter 27. Beam splitter 27 is basically a transmittor, and only a very slight amount of attenuation occurs there. From beam splitter 27, the beam is directed to another beam splitter 28, deflected there through a movable objective lens 29, and onto the optical recording member 30 of the present invention. There is a small but constant amount of leakage through the A/O modulator 23. This small amount of leakage is insufficient to cause writing on the optical recording member 30, but is reflected back along the path shown in a dotted line through a pair of cylindrical lenses 31 and 32 into a focusing detector 33. This signal will permit the focusing detector 33 to keep the movable objective lens 29 in a position to precisely focus the beam onto the optical recording member 30 through the focus control device 34.

The information is recorded on the optical recording member 30 in micron-size bits. Typically, the recording member may contain up to $10^8$ bits information per square centimeter.

When the information recorded on the optical recording member 30 is to be read out, a continuous, low powered beam from laser 20 is directed onto the recording member 30, and thence reflected back through beam splitter 28 into photodetector 35. The signal may be visually displayed on an oscilloscope or the signal may be sent onto the microprocessor 25. The positioning of the optical recording member 30, in both recording and reading processes, is controlled by the microprocessor, as shown. A separate light source having a wavelength not absorbed significantly by the optical recording member can also be used for focusing. Tracking can be achieved by conventional means.

Other apparatus for marking and reading may be used with the optical recording member of the present invention. An example of such other apparatus is disclosed in Roger D. Bates and Gordon R. Knight, U.S. Pat. No. 4,290,122, issued Sept. 15, 1981, for Self-Synchronizing Clock Source for Optical memories, and in Donald James Curry, Gordon R. Knight and Daniel Chester Kowalski, U.S. Pat. No. 4,283,777 issued Aug. 11, 1981, for Optical Memory Having a Parallel Read Out, both of which are commonly assigned to the assignee of the present application.

Thus according to the present invention, a single integral multi-layer optical recording member is provided. This member is structurally a single solid member which is dimensionally stable and fabricated by coating multiple layers on a structural substrate. The device is susceptible to relativly amenable fabrication techniques and can be handled and used without undue care. In addition, the device is capable of being used in an optical recording apparatus employing only a single laser source for both marking and reading. Furthermore the device according to the present invention uses the layers adjacent to the light absorbing layer to initiate the marking process whereas in the prior art devices typically the structure impeded the imaging process or made it occur at a higher energy level. Furthermore the device according to the present invention provides enhanced signal contrast as a result of hole opening whereby maximum contrast is achieved between the highly reflective image area (the hole) and the background (black) area. In addition in the preferred embodiment an archival device both as to age and to physical damage is provided since it is totally enclosed. Furthermore, it provides increased latitude for marking over devices which merely form deformation blisters. The latter devices exhibit the desired blister formation over a very narrow range of laser marking energies. At lower energies no mark is formed and at energies above the desired range the blister bursts to form an irregular hole with unfavorable readout contrast characteristics. With the device of the present invention clean, high contrast holes are formed at all energies above a well-defined threshold energy. This is important since marking typically occurs in recording media which resemble circular disks. Here, because of the difference in linear velocity at the inner and outer radii defining the annular disc area available for recording, the effective dwell time of the disc at the focal point of the marking laser is lower for marking at the outer radius than for marking at the inner radius. It follows that the laser power required to create a mark at the inner radius is lower than that required to create an identical mark at the outer radius. The difference between the energy delivered at constant laser power to the inner and outer radii exceeds the marking latitude for certain blister mode devices. Such devices have insufficient latitude to ensure consistent blister deformation at all radii within the annular area available for recording. With the broad marking latitude achieveable according to the device of the present invention, however, no difference is experienced in the type, quality or contrast of marks formed at any radius in the available recording area.

All the patents and publications described in this specification are hereby specifically incorporated by reference in their entirety into this specification. In particular the disclosures recited in each of the patents and publications are hereby totally incorporated into the specification.

While the invention has been described in detail with reference to specific preferred embodiments, it will be appreciated that various modifications may be made from the specific details without departing from the spirit and scope of the invention.

What is claimed is:

1. A multi-layer optical recording member for use with a recording laser for optically recording and retrieving information thereon comprising in sequential order a structural substrate, a thermally degradable polymer layer, a thin light absorbing recording layer, a thermally degradable polymer dielectric layer and a reflective layer, said substrate and said thermally degradable polymer layers being stable under ambient light and temperature conditions and substantially transparent to the recording and reading optical radiation, the combined thickness of said light absorbing layer and said dielectric layer being such as to provide anti-reflecting conditions at the recording wavelength and optical contrast between marked and unmarked areas at the reading wavelength, said thermally degradable polymer layers decomposing substantially to gaseous products at temperatures below the melting point of the light absorbing recording layer wherein, upon exposure to recording radiation the portion of the light absorbing layer exposed is heated by the absorbed energy which in turn heats adjacent areas of both thermally degradable polymer layers to a level where at least some polymer decomposition with the consequent evolution of gaseous decomposition products occurs resulting in the formation of a hole in the exposed area of the light absorbing layer.

2. The optical recording member according to claim 1, wherein said member is capable of being recorded with radiation of a first wavelength and first energy level to produce a pattern of minute open holes in the light absorbing recording layer which minute pattern is capable of being read with radiation of the same wavelength but at lower energy level below that necessary to form a hole in the recording layer.

3. The multi-layer optical recording member according to claim 2, wherein said light absorbing recording layer is a thin metal or metal alloy.

4. The multi-layer optical recording member according to claim 3, wherein said light absorbing layer is gold or a gold alloy.

5. The multi-layer optical recording member according to claim 4, wherein said light absorbing layer is a gold chromium alloy, the amount of chromium in said alloy being sufficient to lower the thermal conductivity of the layer while retaining its malleable and deformable properties.

6. The multi-layer optical recording member according to claim 5, wherein said gold chromium alloy comprises from about 20 to about 90 atomic percent chromium.

7. The multi-layer optical recording member according to claim 6, wherein said gold chromium alloy comprises chromium in an amount greater than 40 atomic percent.

8. The multi-layer optical recording member according to claim 2, wherein said light absorbing recording layer is from about 25 angstroms to about 200 angstroms in thickness.

9. The multi-layer optical recording member according to claim 8, wherein said light absorbing recording layer is from about 50 angstroms to about 100 angstroms in thickness.

10. The multi-layer optical recording member according to claim 2, wherein said thermally degradable polymer layer between said structural substrate and said light absorbing recording layer is at least about 500 angstroms in thickness.

11. The multi-layer optical recording member according to claim 2, wherein said thermally degradable polymer layer between the light absorbing layer and the reflective layer is at least about 500 angstroms in thickness.

12. The multi-layer optical recording member according to claim 2, wherein said thermally degradable polymer layers are nitrocellulose or polymethyl methacrylate.

13. The multi-layer optical recording member according to claim 2, wherein said reflective layer is aluminum.

14. The multi-layer optical recording member according to claim 2, further including a protective overcoating on said reflective layer.

15. The multi-layer optical recording member according to claim 2, further including a preformatted information layer between said structural substrate and said first thermally degradable polymer layer.

16. The method of making a multi-layer optical recording member for use with a recording laser for optically recording and retrieving information thereon comprising; providing in sequence a structural substrate which is substantially transparent to the recording and reading optical radiation, spin coating a first substantially transparent thermally degradable polymer layer onto said substrate, vacuum evaporating a light absorbing metal layer onto said first polymer layer, spin coating a substantially transparent thermally degradable dielectric polymer on said metal layer, and vacuum evaporating a light reflective layer on said second polymer layer, the combined thickness of said light absorbing layer and said dielectric layer being such as to provide anti-reflecting conditions at the recording wavelength and optical contrast between marked and unmarked areas at the reading wavelength, said thermally degradable polymer layers decomposing substantially to gaseous products at temperatures below the melting point of the light absorbing recording layer, whereby an optical recording member is provided wherein upon exposure to recording radiation the portion of the light absorbing layer exposed is heated by the absorbed energy which in turn heats adjacent areas of both thermally degradable polymer layers to a level where at least some polymer decomposition with the consequent evolution of gaseous decomposition products occurs resulting in the formation of a hole in the exposed area of the light absorbing layer.

17. The method of claim 16, wherein said light absorbing recording layer is a thin metal or metal alloy.

18. The method of claim 17, wherein said light absorbing layer is gold or a gold alloy.

19. The method of claim 18, wherein said light absorbing layer is a gold chromium alloy, the amount of chromium in said alloy being sufficient to lower the thermal conductivity of the layer while retaining its malleable and deformable properties.

20. The method of claim 19, wherein said gold chromium alloy comprises from about 20 to about 90 atomic percent chromium.

21. The method of claim 20, wherein said gold chromium alloy comprises chromium in an amount greater than 40 atomic percent.

22. The method of claim 16, wherein said light absorbing recording layer is from about 25 angstroms to about 200 angstroms in thickness.

23. The method of claim 22, wherein said light absorbing recording layer is from about 50 angstroms to about 100 angstroms in thickness.

24. The method of claim 16, wherein said thermally degradable polymer layer being said structural substrate and said light absorbing recording layer is at least about 500 angstroms in thickness.

25. The method of claim 16, wherein said thermally degradable polymer layer between the light absorbing layer and the reflection layer is at least abut 500 angstroms in thickness.

26. The method of claim 16, wherein said thermally degradable polymer layers are nitrocellulose or polymethyl methacrylate.

27. The method of claim 16, wherein said reflective layer is aluminum.

28. The method of claim 16, including the additional step of providing a protective overcoating on said reflective layer.

29. The method of claim 16, including the step of embossing a preformatted information layer between said structural substrate and said first thermally degradable layer.

30. The method of claim 16 including the step of subjecting said first thermally degradable polymer layer to ion bombardment sufficient to increase the nucleation sites in the polymer layer.

31. The method of optically recording information on an optical recording member comprising the steps of:
providing a multi-layer optical recording member comprising in sequential order a structural substrate, a thermally degradable polymer layer, a thin light absorbing recording layer, a thermally degradable polymer dielectric layer and a reflective layer, said substrate and said thermally degradable polymer layers being stable under ambient light and temperature conditions and substantially transparent to the recording and reading optical radiation; the combined thickness of said light absorbing layer and said dielectric layer being such as to provide anti-reflecting conditions at the recording wavelength and optical contrast between marked and unmarked areas at the reading wavelength, said thermally degradable polymer layers decomposing substantially to gaseous products at temperatures below the melting point of the light absorbing recording layer;
exposing said multi-layer optical recording member to a pattern of recording radiation of a first wavelength and at a first energy level to produce a pattern of minute open holes in the light absorbing recording layer corresponding to said pattern of recording radiation by the light absorbing recording layer becoming heated by the absorbed energy in exposed areas which in turn heat adjacent areas of both thermally degradable polymer layers to a level where at least some polymer decomposition with the consequent evolution of gaseous decomposition products occurs resulting in the formation of a hole in the exposed area of the light absorbing area.

32. The method of optically recording information according to claim 31, further including the steps of reading the information recorded on the multi-layer optical recording member by exposing said recorded member to recording optical radiation of said first wavelength but at a lower energy level below that necessary to form a hole in the recording layer whereby the recording optical radiation is reflected by the reflected substrate where it has been exposed by the recording radiation and absorbed by the recording member in other areas.

33. The method of optically recording information according to claim 31, wherein said light absorbing recording layer is a thin metal or metal alloy.

34. The method of optically recording information according to claim 33, wherein said light absorbing layer is gold or a gold alloy.

35. The method of optically recording information according to claim 34, wherein said light absorbing layer is a gold chromium alloy, the amount of chromium in said alloy being sufficient to lower the thermal conductivity of the layer while retaining its mallable and deformable properties.

36. The method of optically recording information according to claim 35, wherein said gold chromium alloy comprises from about 20 to about 90 atomic percent chromium.

37. The method of optically recording information according to claim 36, wherein said gold chromium alloy comprises chromium in an amount greater than 40 atomic percent.

38. The method of opticlly recording information according to claim 31, wherein said light absorbing recording layer is from about 25 angstroms to about 200 angstroms in thickness.

39. The method of optically recording information according to claim 31, wherein said light absorbing recording layer is from about 50 angstroms to about 100 angstroms in thickness.

40. The method of optically recording information according to claim 31, wherein said thermally degradable polymer layer between said structural substrate and said light absorbing recording layer is at least about 500 angstroms in thickness.

41. The method of optically recording information according to claim 31, wherein said thermally degradable polymer layer between the light absorbing layer and the reflection layer is at least about 500 angstroms in thickness.

42. The method of optically recording information according to claim 31, wherein said thermally degradable polymer layers are nitrocellulose or polymethyl methacrylate.

43. The method of optically recording information according to claim 31, wherein said reflective layer is aluminum.

44. The method of optically recording information according to claim 31, further including a protective overcoating on said reflective layer.

45. The method of optically recording information according to claim 31, further including a preformatted information layer between said structural substrate and said first thermally degradable polymer layer.

* * * * *